United States Patent [19]

Rybicki et al.

[11] Patent Number: 5,742,527

[45] Date of Patent: Apr. 21, 1998

[54] FLEXIBLE ASYMMETRICAL DIGITAL SUBSCRIBER LINE (ADSL) RECEIVER, CENTRAL OFFICE USING SAME, AND METHOD THEREFOR

[75] Inventors: Mathew A. Rybicki; Michael R. May, both of Austin; Matthew A. Pendleton, Cedar Park; Terence L. Johnson; Peter R. Molnar, both of Austin, all of Tex.

[73] Assignee: Motorola, Inc., Schaumburg, Ill.

[21] Appl. No.: 616,818

[22] Filed: Mar. 15, 1996

[51] Int. Cl.⁶ .................................................. H04L 5/20
[52] U.S. Cl. .................... 364/705.05; 375/260; 375/295; 370/484; 370/526; 379/386
[58] Field of Search ................ 364/514 R, 705.05; 375/260, 219, 222, 240, 207, 295, 285, 348–349; 348/6, 12; 379/90, 93, 97, 98, 283, 386; 370/431, 464, 498, 503, 201, 264, 355, 362, 484, 526; 455/3.1, 4.2, 6.3

[56] References Cited

U.S. PATENT DOCUMENTS

| | | | |
|---|---|---|---|
| 4,740,955 | 4/1988 | Litterer et al. | 370/67 |
| 4,999,830 | 3/1991 | Agazzi | 370/286 |
| 5,033,062 | 7/1991 | Morrow et al. | 379/97 |
| 5,214,693 | 5/1993 | Chujo | 379/386 |
| 5,299,192 | 3/1994 | Guo et al. | 370/70 |
| 5,392,348 | 2/1995 | Park et al. | 379/386 |
| 5,400,322 | 3/1995 | Hunt et al. | 370/468 |
| 5,408,260 | 4/1995 | Arnon | 348/6 |
| 5,410,750 | 4/1995 | Cantwell et al. | 455/306 |
| 5,479,453 | 12/1995 | Anvari et al. | 375/348 |
| 5,483,530 | 1/1996 | Davis et al. | 370/79 |
| 5,519,731 | 5/1996 | Cioffi | 375/260 |
| 5,606,577 | 2/1997 | Grube et al. | 375/260 |
| 5,613,190 | 3/1997 | Hylton | 348/6 |

OTHER PUBLICATIONS

John M. Cioffi, "DMT Information Bus for Multidrop Interface on Existing Wiring",pub.Jun. 6, 1994, DMT Info Bus (94–126)Cioffi, pp. 1–6.

Draft American National Standard for Telecommunications, Network and Customer Installation Interfaces, "Asymmetric Digital Subscriber Line (ADSL) Metallic Interface", TIE1.4/94–007R7, pp. i–170.

*Primary Examiner*—Emanuel Todd Voeltz
*Assistant Examiner*—Bryan Bui
*Attorney, Agent, or Firm*—Daniel D. Hill

[57] ABSTRACT

An ADSL receiver (200) receives an upstream modified ADSL signal and an ISDN signal from a remote terminal (32) on a twisted-pair copper wire (18). An ADSL transmitter (100) of the remote terminal (32) transmits the ADSL signal in a frequency range above an ISDN frequency range so that the ADSL signal does not overlap the frequency range of the ISDN signal. In one embodiment, the ADSL receiver (200) includes a band pass filter (201), an analog-to-digital converter (203), a decimator (205), a fast Fourier transform (210), and a digital signal processor (212). The decimator (205) converts the ADSL signal back to base band, thus allowing an ADSL signal source to simultaneously utilize the telephone line with an ISDN signal source, without significantly reducing ADSL throughput.

19 Claims, 10 Drawing Sheets

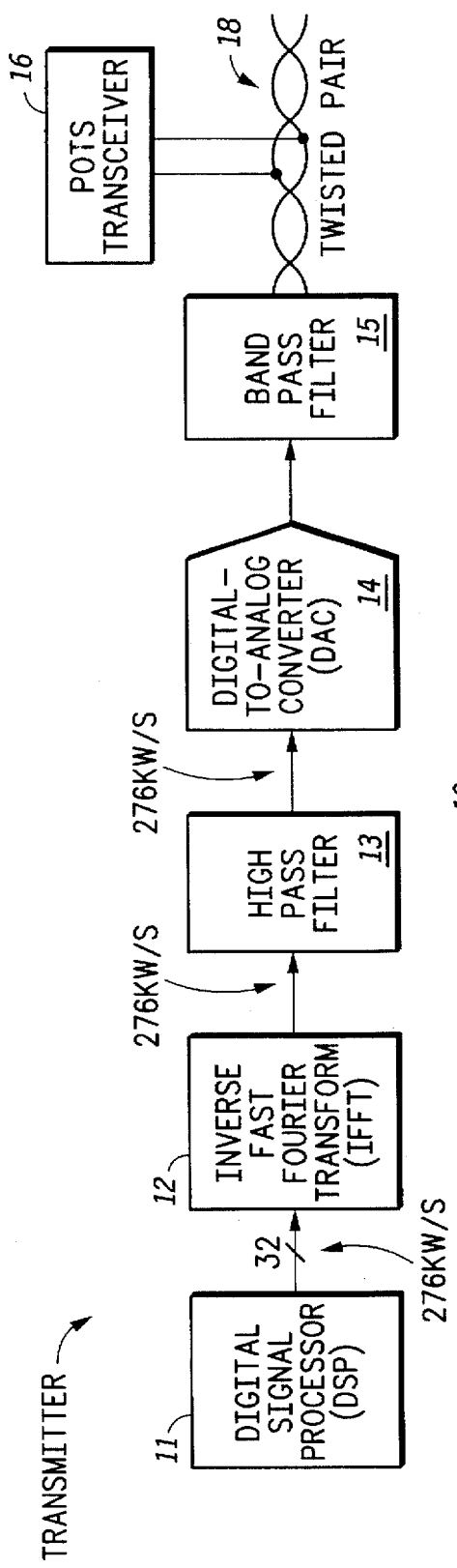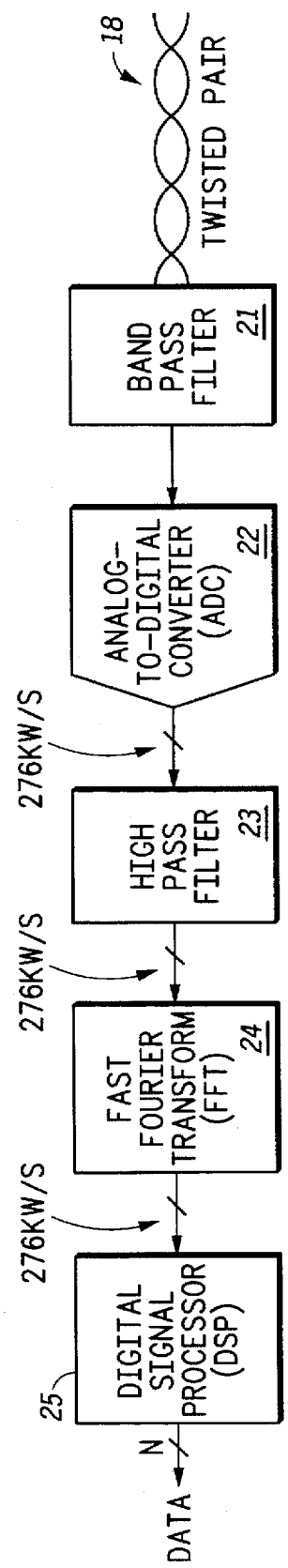

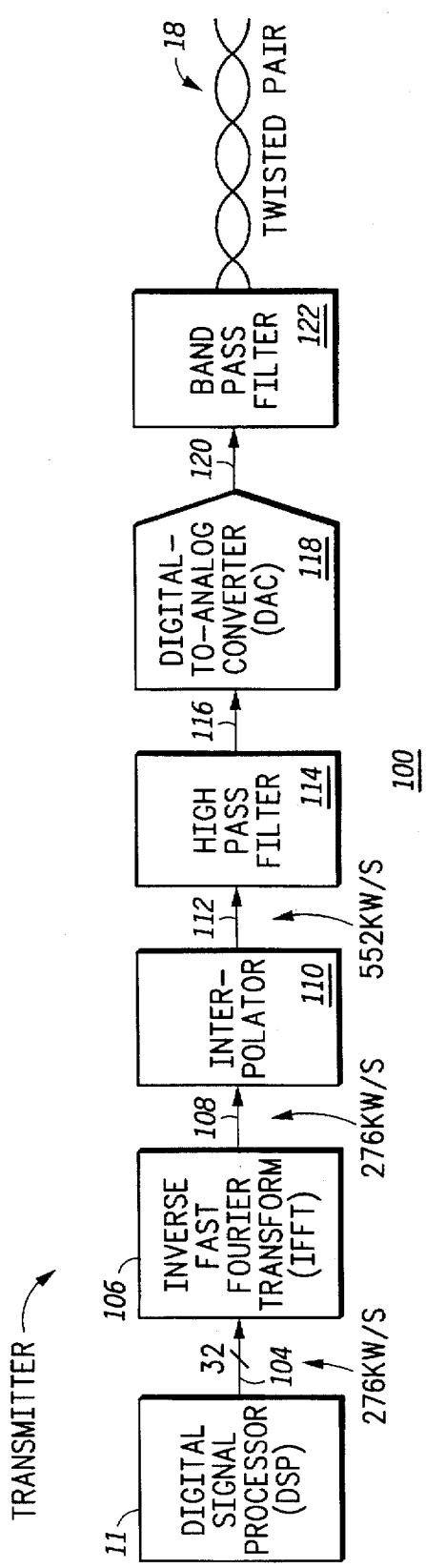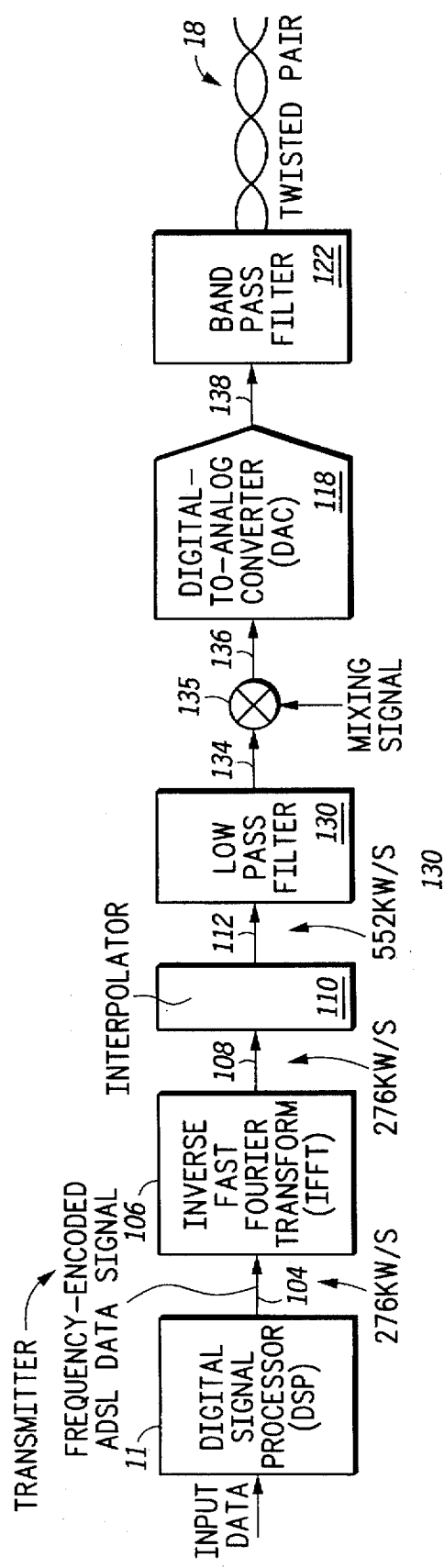

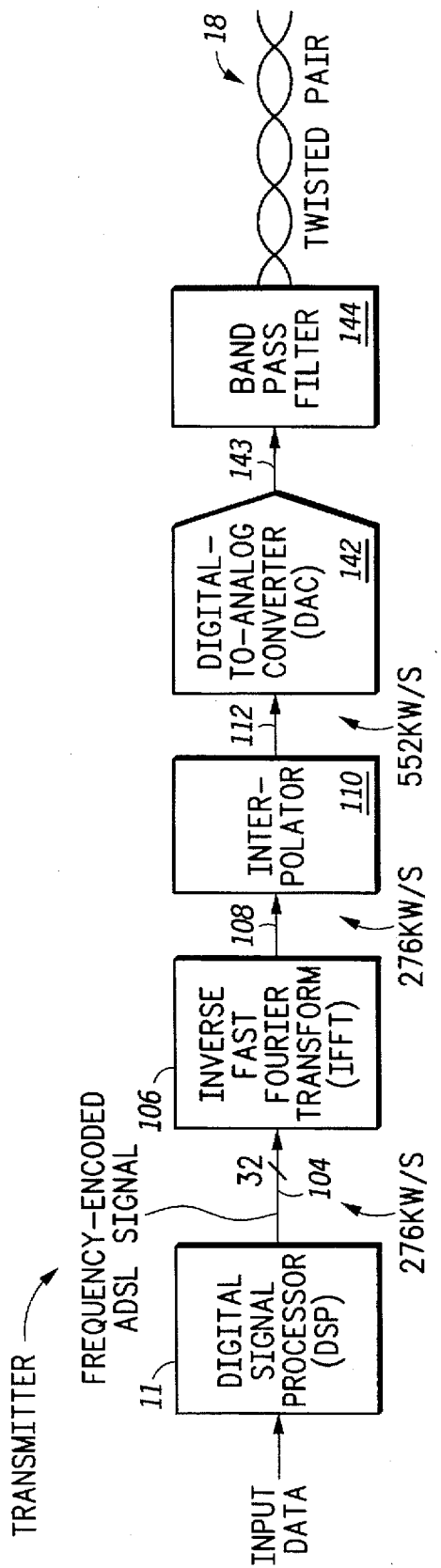
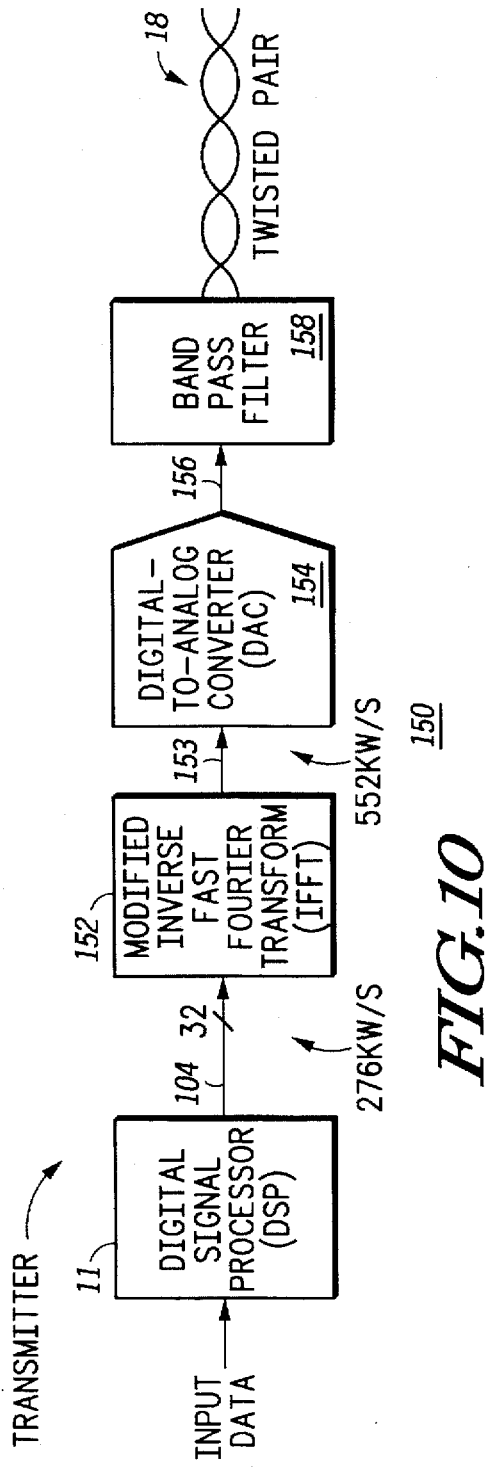

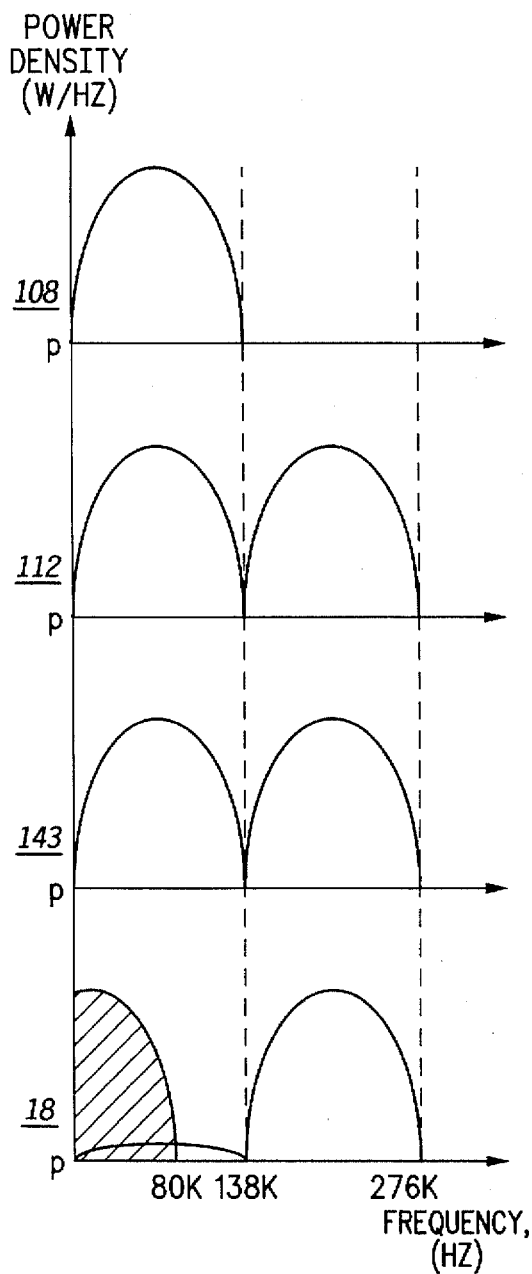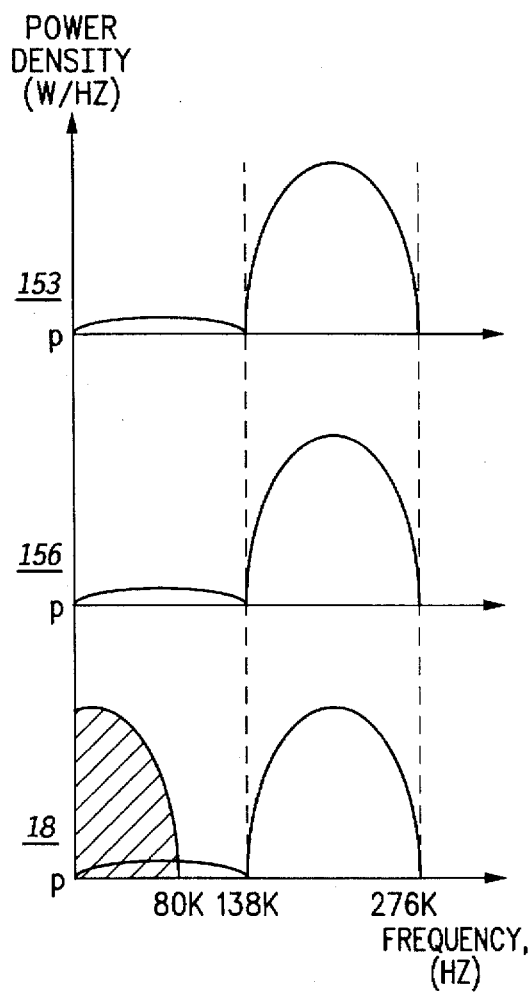
*FIG.9*  *FIG.11*

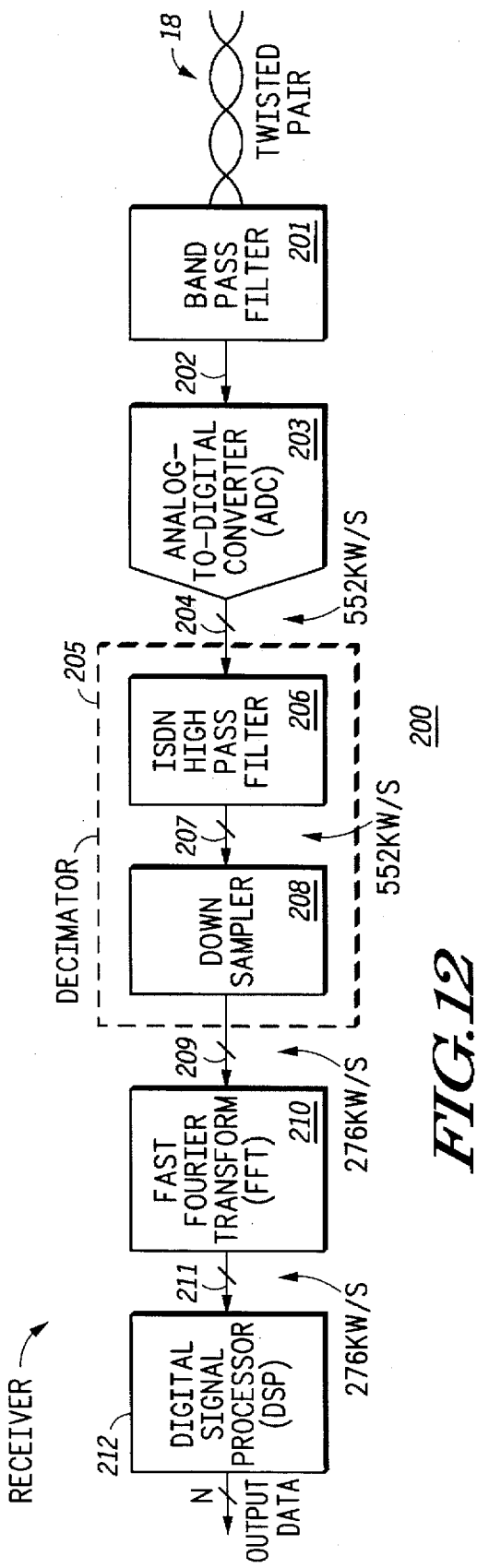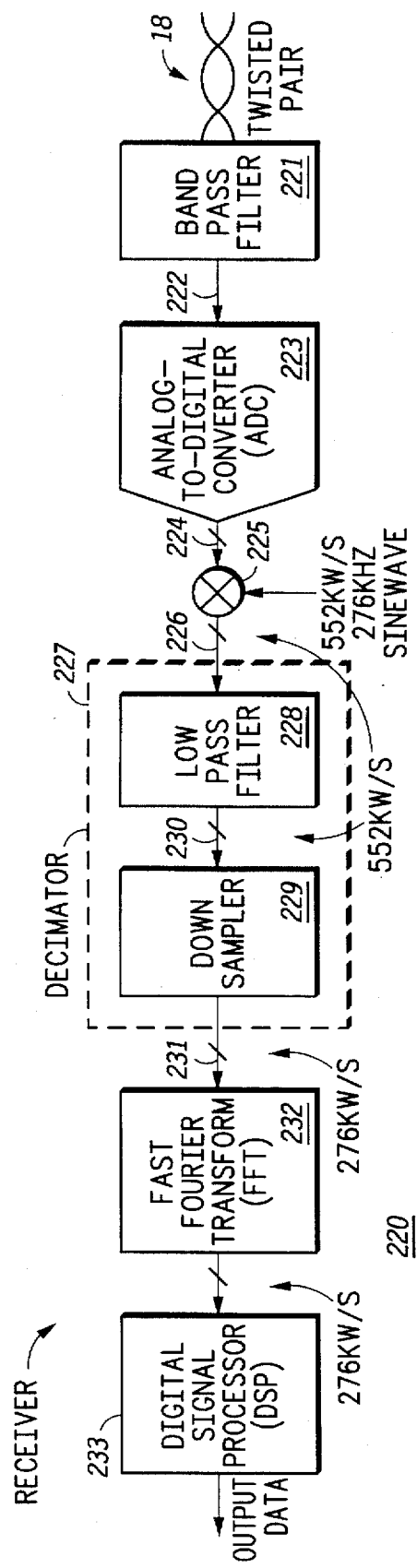

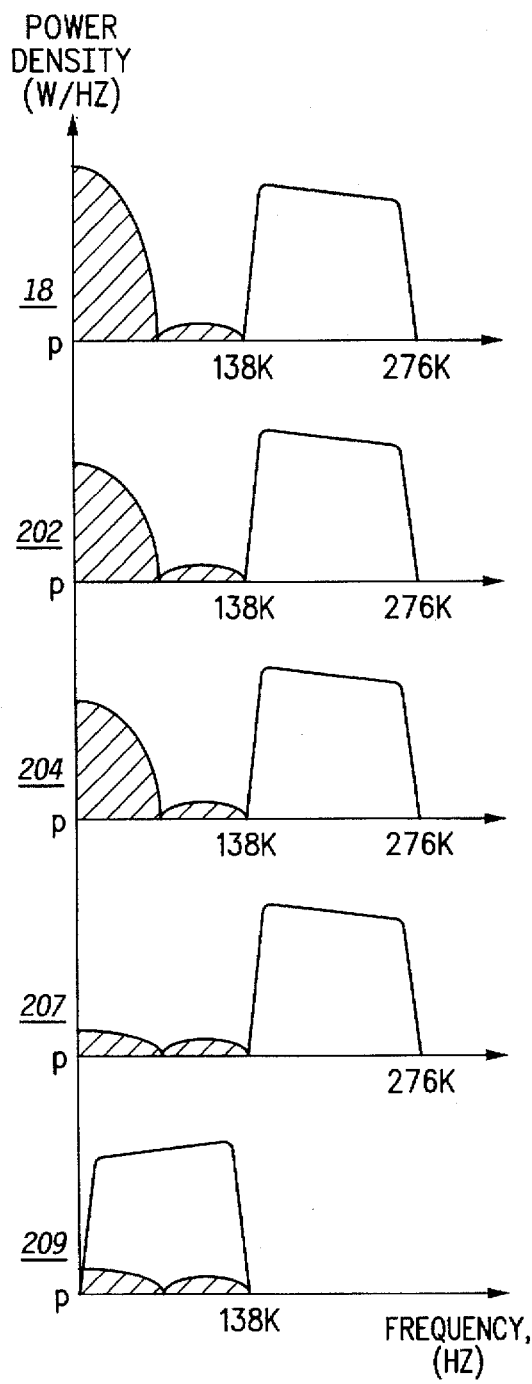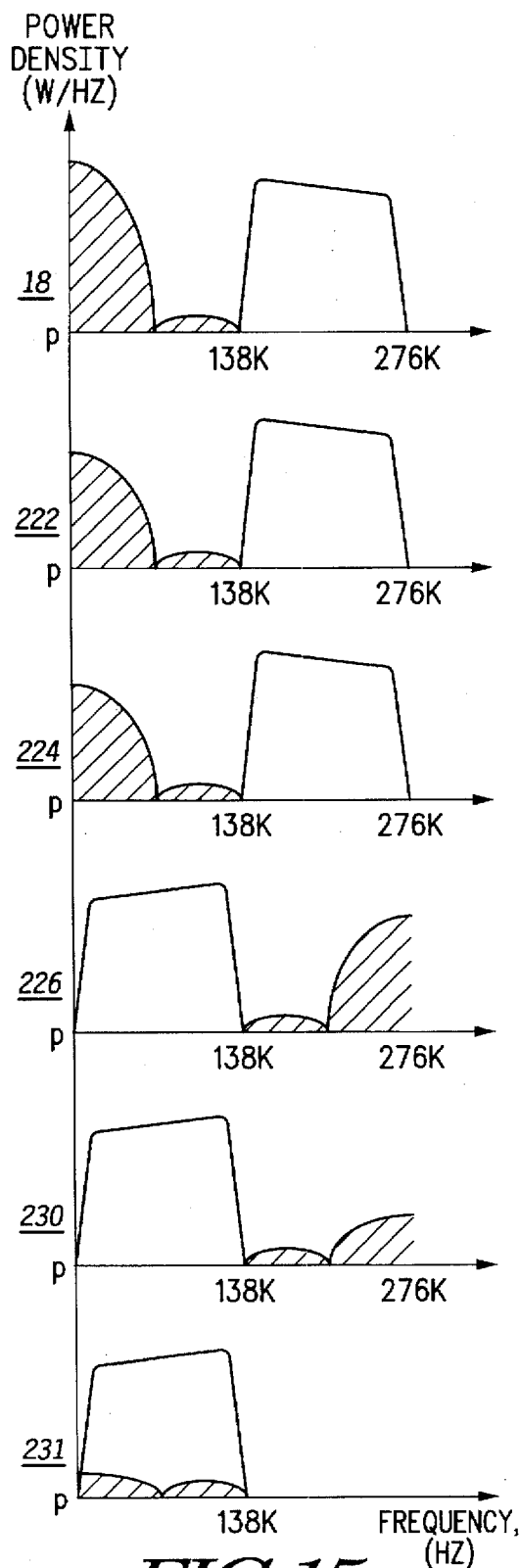
FIG.13
FIG.15

FLEXIBLE ASYMMETRICAL DIGITAL SUBSCRIBER LINE (ADSL) RECEIVER, CENTRAL OFFICE USING SAME, AND METHOD THEREFOR

CROSS REFERENCE TO RELATED APPLICATIONS

A related application entitled "Flexible Asymmetrical Digital Subscriber Line (ADSL) Transmitter, Remote Terminal Using Same, And Method Therefor", by Rybicki et al., and having Attorney Docket Number SC90042A, (Ser. No. 08/616,819), is filed concurrently herewith, and assigned to the assignee hereof.

1. Field of the Invention

This invention relates generally to communications, and more particularly, to an asymmetrical digital subscriber line (ADSL) receiver.

2. Background of the Invention

The North American Integrated Service Digital Network (ISDN) Standard, defined by the American National Standard Institute (ANSI), regulates the protocol of information transmissions over telephone lines. In particular, the ISDN standard regulates the rate at which information can be transmitted and in what format. ISDN allows full duplex digital transmission of two 64 kilo bit per second data channels and then greatly exceeds the capabilities of data transmission using conventional analog modems.

In order to make high data rate interactive services such as video conferencing available to more residential and small business customers, high-speed data communication paths are required. Although fiber optic cable is the preferred transmission media for such high data rate services, it is not readily available in existing communications networks, and the expense of installing fiber optic cable is prohibitive. Current telephone wiring connections, which consist of copper twisted-pair media, are not designed to support the data rates, or bandwidth, required for interactive services. Asymmetric Digital Subscriber Lines (ADSL) technology has been developed to increase the effective bandwidth of existing twisted-pair connections, allowing interactive services to be provided without requiring the installation of new fiber optic cable.

Discrete Multi-Tone (DMT) is a multicarrier technique that divides the available bandwidth of twisted-pair connections into many subchannels. The DMT technique has been adopted by the ANSI T1E1.4 (ADSL) committee for use in ADSL systems. In ADSL, DMT is used to generate 250 separate 4.3125 kHz subchannels from 26 kHz to 1.1 MHz for downstream transmission to the end user, and 26 subchannels from 26 kHz to 138 kHz for upstream transmission by the end user. The transmission capability of the individual subchannels are evaluated for each connection, and data is allocated to the subchannels according to their transmission capabilities (the number of bits each subchannel can support). Subchannels that are not capable of supporting data transmission are not used, whereas the bit-carrying capacity of subchannels that can support transmission is maximized. Thus, by using DMT in an ADSL system, the transmission capability of each twisted-pair connection is maximized over the fixed bandwidth.

Once the transmission capability of a connection has been established, the data transfer process begins by encoding the data. Data in an ADSL system is grouped in frames, where a frame represents a time-slice of the data to be transmitted. Bits from the frames are assigned to the subchannels based on the number of bits that each subchannel can support, and the subchannels are encoded by creating a frequency-domain vector set. Frequency-domain vectors in the vector set use phase and magnitude components to encode the values of the bits. An Inverse Fast Fourier Transform (IFFT) performs a frequency-to-time conversion of the frequency-domain vectors, resulting in digital time-domain information. A digital-to-analog converter (DAC) then converts the digital information to an analog signal which a transmitter transmits onto the copper twisted-pair media.

ISDN operates in a frequency range between 0 kHz and 80 kHz. Because ISDN and ADSL have overlapping frequency bands, both ISDN data and ADSL data cannot be automatically transmitted on the same twisted-pair at the same time. One prior art technique to allow simultaneous transmission is to prevent, through filtering, the central office ADSL receiver from receiving a DMT signal in 0 Hz to 80 kHz frequency range. Though this would allow the ADSL and ISDN receivers to operate simultaneously, the throughput of the ADSL channels are reduced because all of the channels cannot be utilized.

BRIEF DESCRIPTION OF THE DRAWINGS

FIG. 1 illustrates, in block diagram form, an asymmetric digital subscriber line (ADSL) transmitter according to the prior art.

FIG. 2 illustrates, in block diagram form, an ADSL receiver according to the prior art.

FIG. 4 illustrates, in block diagram form, a first embodiment of an ADSL transmitter for use in the system of FIG. 3.

FIG. 6 illustrates, in block diagram form, a second embodiment of an ADSL transmitter for use in the system of FIG. 3.

FIG. 8 illustrates, in block diagram form, a third embodiment of an ADSL transmitter for use in the system of FIG. 3.

FIG. 9 illustrates a graph of the spectral contents of signals conducted in the transmitter of FIG. 8.

FIG. 10 illustrates, in block diagram form, a fourth embodiment of an ADSL transmitter for use in the system of FIG. 3.

FIG. 11 illustrates a graph of the spectral contents of signals conducted in the transmitter of FIG. 10.

FIG. 12 illustrates, in block diagram form, a first embodiment of an ADSL receiver for use in the system of FIG. 3.

FIG. 13 illustrates a graph of the spectral contents of signals conducted in the receiver of FIG. 12.

FIG. 14 illustrates, in block diagram form, a second embodiment of an ADSL receiver for use in the system of FIG. 3.

FIG. 15 illustrates a graph of the spectral contents of signals conducted in the receiver of FIG. 14.

DESCRIPTION OF A PREFERRED EMBODIMENT

Figure 3:
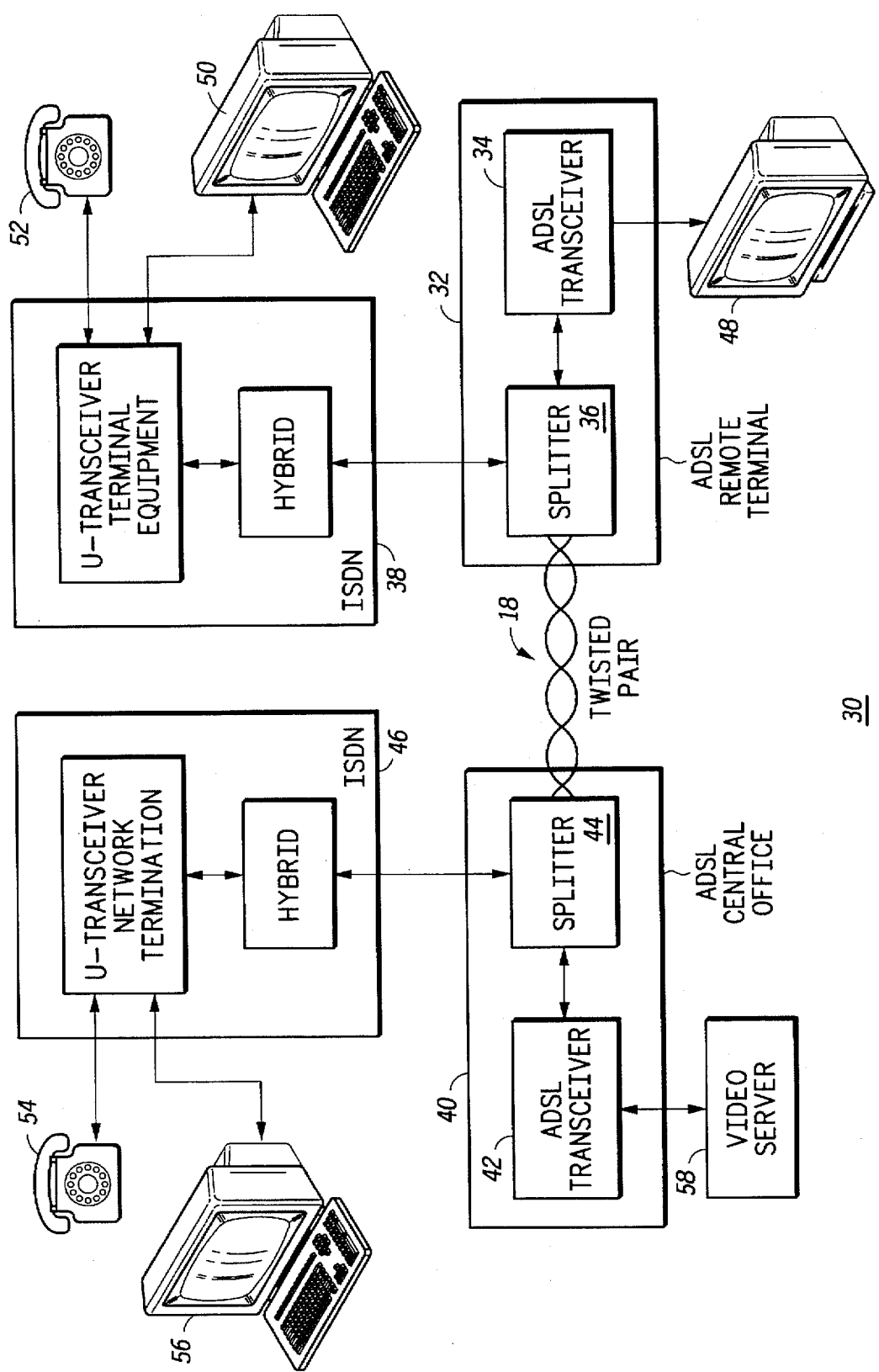
FIG. 3 illustrates, in block diagram form, an asymmetric digital subscriber line (ADSL) system which allows simultaneous integrated services digital network (ISDN) transmission over the same telephone line, according to the present invention.

Generally, the present invention provides an ADSL receiver for receiving a modified upstream ADSL signal from a remote terminal on a twisted-pair copper wire that is also being used for ISDN communications. A transmitter of the remote terminal transmits the modified upstream ADSL signal having a frequency content above an ISDN frequency content so that the ADSL signal does not overlap, or interfere with the frequency content of the ISDN signal. In one embodiment, the ADSL receiver includes a band pass filter, an analog-to-digital converter, a decimator, a time-to-frequency converter, and a digital signal processor. The decimator converts the modified upstream ADSL signal back to base band, thus allowing an ADSL signal source to simultaneously utilize the telephone line with an ISDN signal source, without significantly reducing ADSL throughput.

FIG. 1 illustrates in block diagram form an Asymmetric Digital Subscriber Line (ADSL) transmitter 10 according to the prior art. Transmitter 10 generally includes a digital signal processor (DSP) 11, an inverse fast Fourier transform (IFFT) 12, a high pass filter 13, a digital to analog converter (DAC) 14, and a band pass filter 15, all of which are coupled to a telephone transmission line represented as a twisted pair of conductors 18. Note that in transmitter 10 of FIG. 1 additional signal processing functions such as an echo canceller, a transmission line hybrid, and the like are present but are omitted for ease of discussion. Also connected to twisted pair 18 is a telephone receiver 16 labeled "POTS TRANSCEIVER". POTS TRANSCEIVER16 is so designated because it is a conventional telephone or "plain old telephone set".

DSP 11 represents the digital signal processing functions necessary to implement an upstream ADSL channel and includes all the functions defined by the ANS T1.43 standard. DSP 11 has an output for providing 32 complex symbols. Each symbol is represented by a real and imaginary component and represents the signal in predetermined frequency bands as defined by the ADSL standard. The effective data rate of DSP 11 is 276 kilowords per second (kW/s), in which each word represents either a real portion or an imaginary portion of the complex symbol. DSP 11 may be implemented with a general-purpose digital signal processor such as the DSP56300 available from Motorola, Inc. with appropriate software, a special-purpose DSP, or some combination of the two.

IFFT 12 is a signal processor block which converts the real and imaginary symbols into a corresponding time domain representation and may be any conventional IFFT signal processor. IFFT 12 outputs a time domain signal at a data rate of 276 kW/s. High pass filter 13 has an input connected to the output of IFFT 12 and an output. High pass filter 13 is a digital high pass filter which provides a low frequency cut off at approximately 26 kHz. High pass filter 13 provides an output also at 276 kW/s. DAC 14 has an input connected to the output of high pass filter 13 and an output. DAC 14 converts the high pass filtered digital signal into a corresponding analog representation. DAC 14 may be any conventional DAC architecture such as sigma delta, resistor ladder, or the like. Band pass filter 15 has an input connected to the output of DAC 14, and an output connected to twisted pair 18 via a transmission line hybrid (not shown in FIG. 1). Band pass filter 15 has a pass band between a 26 kHz and 138 kHz. POTS TRANSCEIVER 16, being designed for transmitting voice signals, has a bandwidth of from 0 to 4 kHz. Thus, the connection of POTS TRANSCEIVER16 to twisted pair 18 does not interfere with the ADSL transmission because the frequency contents of the two signal sources are non-overlapping.

FIG. 2 illustrates in block diagram form an ADSL receiver 20 according to the prior art. ADSL receiver 20 may be used as a receiver of upstream ADSL data at a central office (CO) and may be used in conjunction with transmitter 10 of FIG. 1. Receiver 20 includes generally a band pass filter 21, an analog-to-digital converter (ADC) 22, a high pass filter 23, a fast Fourier transform (FFT) 24, and a DSP 25. Band pass filter 21 has an input connected to twisted pair 18 through a transmission line hybrid, not shown, and an output. Band pass filter 21 has a pass band between 26 kHz and 138 kHz. ADC 22 has an input connected to the output of band pass filter 21 and output. ADC 22 may use any conventional analog-to-digital conversion technique such as sigma-delta, successive approximation, and the like. ADC 22 provides an output at a data rate of 276 kW/s. High pass filter 23 has an input connected to the output of ADC 22, and an output. High pass filter 23 has a low frequency cutoff of 26 kHz, and provides its output signal at a data rate of 276 kW/s. FFT 24 has an input connected to the output of high pass filter 23, and an output. FFT 24 provides 32 complex numbers, each having a real and an imaginary component, representing the signal in various frequency bands associated with the upstream data transmission defined by the ADSL standard. FFT also provides its output at a data rate of 276 kW/s. DSP 25 has an input connected to the output of FFT 24, and an output for providing a signal labeled "DATA". Note that receiver 20 performs the analogous functions of transmitter 10, but in the opposite direction.

Considering FIGS. 1 and 2 together, transmitter 10 and receiver 20 may be used to implement an ADSL upstream data channel. In addition, POTS transceiver 16 is able to operate simultaneously on the same twisted pair 18. Thus, a voice telephone call may occur at the same time as an ADSL transmission. It may also be desirable to connect an ISDN signal source to twisted pair 18. However, the ADSL upstream system would not operate reliably because the output signal provided by transmitter 10 to twisted pair 18 has frequency content in the range of 26 kHz to 138 kHz, which would cause interference with the ISDN signal having a 0 to 80 kHz frequency content.

The present invention can be more fully described with reference to FIGS. 3–19. FIG. 3 illustrates, in block diagram form, a communication system 30 which allows simultaneous transmission of ISDN and ADSL over the same telephone line according to the present invention. Communication system 30 includes ADSL central office 40, ADSL remote terminal 32, ISDN transceiver 38, and ISDN transceiver 46. ADSL remote terminal 32 includes ADSL transceiver 34 and splitter 36. Coupled to ADSL remote terminal 32 may be a communications device, such as television receiver 48. Twisted pair 18 couples the ADSL remote terminal 32 to the ADSL central office 40. Coupled to ADSL central office 40 may be a communications device, such as video server 58.

ADSL central office 40 includes ADSL transceiver 42 and splitter 44. Splitter 44 couples ADSL transceiver 42 to twisted pair 18, and splits received ISDN and ADSL signals to the appropriate corresponding receiver. Likewise, splitter 44 couples transmitted signals from both the ISDN transmitter and the ADSL transmitter to twisted pair 18. Splitter 44 includes band pass filter circuits for isolating the received ADSL signals from the ISDN signals, and circuits for combining the ADSL signals with the ISDN signals for transmission over the twisted pair. Splitter 36 function in the same manner as splitter 44, and splits or combines ADSL and ISDN signals as necessary.

Communications devices, such as telephone 52 or computer terminal 50 may be coupled to ISDN transceiver 38. Likewise, coupled to ISDN transceiver 46 may be computer terminal 56 and/or telephone 54. In operation, communication system 30 allows simultaneous transmission and reception of ISDN and ADSL signals on twisted pair 18. ADSL transceiver 34 includes an ADSL transmitter in accordance with the present invention, as illustrated in detail in FIG. 4, FIG. 6, FIG. 8, or FIG. 10. ADSL transceiver 34 transmits an upstream ADSL signal across twisted pair 18 to ADSL central office 40. ADSL transceiver 42 and central office 40 includes one of the receivers illustrated in FIG. 12, FIG. 14, FIG. 16, or FIG. 18 and receives the upstream data signal from ADSL transceiver 34. As will be described later and in more detail, ADSL transceiver 34 shifts or modifies the upstream ADSL signal up to a higher frequency band than that used by an ISDN network. The modified upstream ADSL signal can be transmitted along twisted pair 18 simultaneously with the ISDN signal. An ADSL receiver of ADSL transceiver 42 of the central office 40 band pass filters the ISDN signal and returns the modified upstream ADSL signal back to its original spectral band where it is converted to digital output data for use by a DSP. The downstream ADSL from ADSL central office 40 is modified so that it does not use the frequency band occupied by the ISDN signal. This modification is accomplished by changing the cut off frequency of the high pass filter of the downstream transmitter of ADSL transceiver 42 and of the high pass filter of the downstream receiver of ADSL transceiver 34.

FIG. 4 illustrates in block diagram form a first embodiment of an ADSL transmitter 100 for use in communication system 30 of FIG. 3. ADSL transmitter 100 includes generally DSP 11, an IFFT 106, an interpolator 110, a high pass filter 114, a DAC 118, and a band pass filter 122. DSP 11 performs the same signal processing functions as DSP 11 of FIG. 1 to provide an output 104. Output 104 conducts 32 complex symbols, each having a real and an imaginary component, at a data rate of 276 kilowords/second (kW/s). IFFT 106 has an input connected to output 104, and an output 108. IFFT 106 provides a time domain representation of the 32 complex symbols conducted on output 104 at a data rate of 276 kW/s. Interpolator 110 has an input connected to output 108, and an output 112. Interpolator 110 converts the 276 kW/s time domain signal on output 108 into a 552 kW/s interpolated signal on output 112. Interpolator 110 may be implemented by using any conventional digital interpolator. High pass filter 114 has an input connected to output 112, and an output 116. High pass filter 114 has a cutoff frequency of 138 kHz and rolls off between 80 kHz and 138 kHz such that no significant signal energy below 80 kHz is present in the high pass filtered signal provided on output 116. DAC 118 has an input connected to output 116, and an output 120. DAC 118 converts the high pass filtered signal on output 116 into analog form. DAC 118 may use any conventional DAC architecture such as sigma delta, resistor ladder, and the like. Preferably, DAC 118 is implemented as a sigma-delta converter due to the ease of implementation using well known digital circuitry. Band pass filter 122 has an input connected to output 120, and an output connected to twisted pair 18 through a transmission line hybrid, not shown in FIG. 4. Band pass filter 122 has a pass band between 138 kHz and 276 kHz.

In operation, transmitter 100 is able to provide a modified ADSL upstream signal to twisted pair 18 simultaneously with the operation of an ISDN transceiver on the same physical medium. Transmitter 100 alters the frequency content of the ADSL symbols by changing the frequency bands in which there is significant energy to those frequency bands which do not overlap with the frequency content of the ISDN signal source. Note that transmitter 100 achieves the frequency alteration without substantially affecting the operation of DSP 11 in creating ADSL symbols. Thus transmitter 100 may be constructed from an existing standard-compliant ADSL transmitter, such as transmitter 10 of FIG. 1, with minimal circuit modification.

Figure 5:
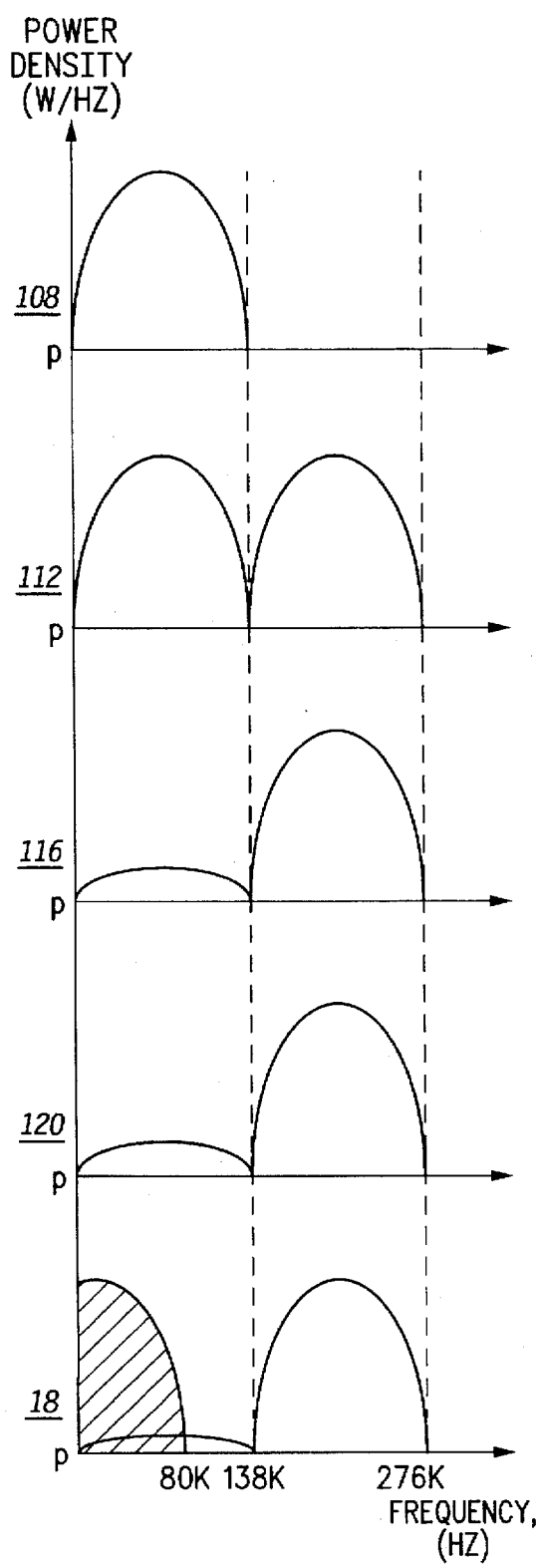
FIG. 5 illustrates a graph of the spectral contents of signals conducted in the transmitter of FIG. 4.

FIG. 5 illustrates a graph of the frequency contents of signals conducted in transmitter 100 of FIG. 4. In FIG. 5 and in succeeding Figs., the vertical axis represents power density which is measured, for example, in watts per hertz (W/Hz). The horizontal axis represents frequency and is measured in, for example, Hz. Each signal is designated by its corresponding reference number to the left of the vertical axis. The baseline value is designated "p", which theoretically is zero but in an actual implementation may be non zero due to white noise. Cross-hatching represents the power density introduced by an ISDN signal source.

Considering now FIG. 5 in conjunction with FIG. 4, output signal 108 has significant frequency content between 0 and 138 kHz. Interpolator 110 provides output signal 112 by interpolating signal 108. The effect of this interpolation is to mirror the power spectrum around the frequency of 138 kHz. High pass filter 114 then attenuates those frequencies between 0 and 80 kHz, such that output signal 116 has a relatively small power density between 0 and 138 kHz and a power density between 138 kHz and 276 kHz which corresponds to the power density of output signal 108, but in a different frequency range. DAC 118 provides an analog output signal 120 which has substantially the same power density as output signal 116, but is represented in analog form. Note that if DAC 118 is implemented using sigma-delta techniques, an additional low pass noise shaping filter is required to filter out the quantization noise introduced into the frequency spectrum. Band pass filter 122 then provides additional filtering for those frequencies outside the range of 138 kHz to 276 kHz.

Note that due to the presence of an ISDN signal source connected to twisted pair 18, there will be an additional signal with significant power density between 0 and 80 kHz present on twisted pair 18. However, due to the action of transmitter 100, these two frequency spectra do not overlap. Thus, transmitter 100 is able to transmit an ADSL upstream signal over a common telephone line simultaneously with an ISDN signal source without interference. Note that in addition to allowing the simultaneous operation of an ISDN signal source on twisted pair 18, transmitter 100 is able to operate simultaneously with any other signal source which only has a frequency content below 138 kHz.

FIG. 6 illustrates in block diagram form a second embodiment of an ADSL transmitter 130 for use in communication system 30 of FIG. 3. As in transmitter 100, transmitter 130 includes DSP 11, IFFT 106, interpolator 110, DAC 118, and band pass filter 122 all of which are designated by the same reference numbers and operate the same as the corresponding components in FIG. 4.

Transmitter 130 differs from transmitter 100, however, by including a low pass filter 132 and a multiplier 135. Low pass filter 132 has an input connected to output 112, and an output 134. Low pass filter 132 attenuates frequencies above 138 kHz such that above 218 kHz no significant signal energy is passed. Multiplier 135 has a first input connected to output 134, a second input for receiving a signal labeled "MIXING SIGNAL", and an output 136. The mixing signal is a sinusoidal signal having a frequency of 276 kHz. Since output signal 134 is a digital signal, the MIXING SIGNAL may be represented as a digital sinusoidal signal having values alternating between +1 and −1. DAC 118 has an input connected to output 136 and converts it to an analog representation provided as an output signal 138 to band pass filter 122. Band pass filter 122 has an input connected to output 138, and performs band pass filtering as described for transmitter 100 of FIG. 4. Note as before, if DAC 118 is implemented using sigma-delta techniques, it will also include a low pass quantization noise filter. Transmitter 130 is an alternate way of implementing the functionality of transmitter 100. Like transmitter 100, transmitter 130 also allows DSP 11 to remain substantially unchanged.

Figure 7:
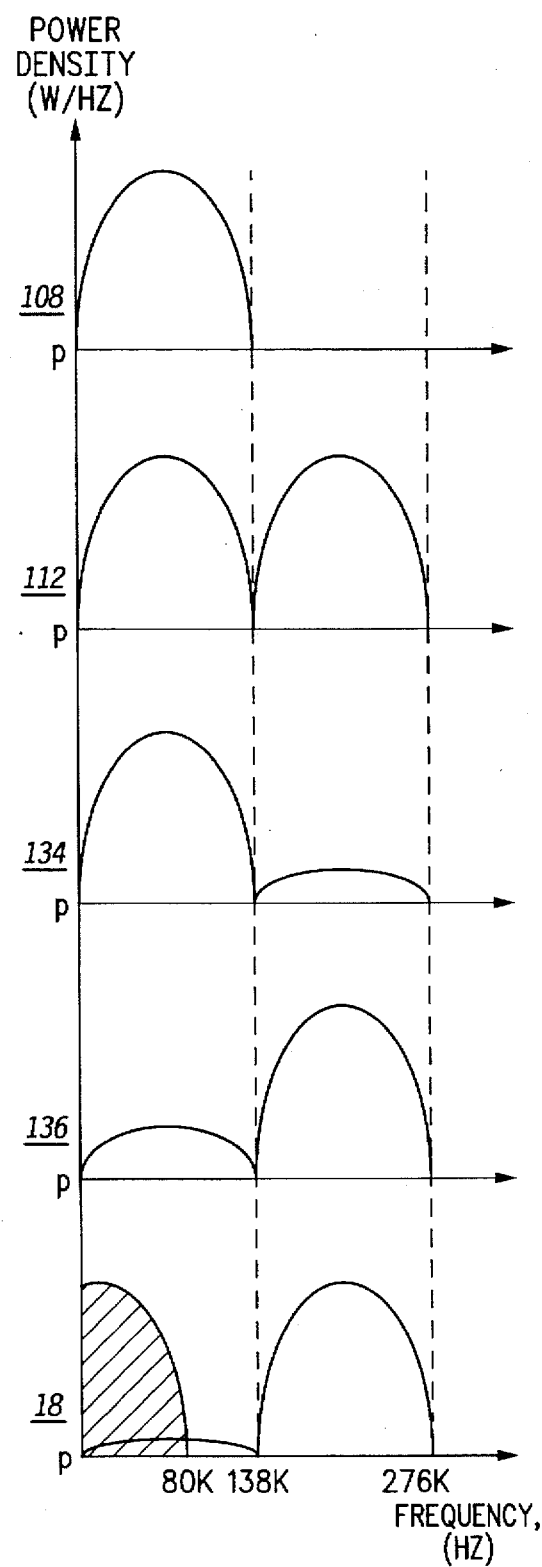
FIG. 7 illustrates a graph of the spectral contents of signals conducted in the transmitter of FIG. 6.

FIG. 7 illustrates a graph of the frequency contents of signals conducted in transmitter 130 of FIG. 6. Considering now FIG. 7 in conjunction with FIG. 6, note that signals 108 and 112 are identical to the corresponding to the signals of FIG. 5. Output signal 134 has significant power density between 0 and 138 kHz, but has an attenuated power density between 138 kHz and 276 kHz due to low pass filter 132. Multiplier 135 mirrors the power density of output signal 134 around the frequency of 138 kHz such that output signal 136 only has significant power density between 138 kHz and 276 kHz. Signal is further attenuated in the range of between 0 and 138 kHz through band pass filter 122 which, as before, passes frequencies in the range of 138 kHz to 276 kHz. As before, twisted pair 18 is able to pass information of an ISDN signal source having significant power in the range of between 0 and 80 kHz.

FIG. 8 illustrates in block diagram form a third embodiment of an ADSL transmitter 140 for use in communication system 30 of FIG. 3. As before, common elements are assigned the same reference numbers. Transmitter 140 includes generally DSP 11, IFFT 106, interpolator 110, a DAC 142, and a band pass filter 144. DAC 11, IFFT 106, and interpolator 110 operate as described with reference to FIGS. 4 and 6 and will not be further discussed. DAC 142 has an input connected to output 112 and an output 143. Note that DAC 142 may operate in the same manner as DAC 118 of FIGS. 4 and 6; however, DAC 142 is connected directly to output 112 without the need for a high pass filter 114 as in transmitter 100, or a low pass filter 132 as in transmitter 130. Band pass filter 144 has an input connected to output 143 and an output connected to twisted pair 18 through a transmission line hybrid, not shown in FIG. 8. Transmitter 140 differs from transmitter 100 in that band pass filter 144 is used solely to attenuate the frequency content below 138 kHz.

FIG. 9 illustrates a graph of the frequency contents of signals conducted in transmitter 140 of FIG. 8. Considering now FIG. 9 in conjunction with FIG. 8, signal 108 has significant energy in the range of between 0 and 138 kHz and as before, output signal 112 has energy as well between 138 kHz and 276 kHz. Note that DAC 142 passes all these frequencies because any noise shaping quantization filter attenuates signals only above 276 kHz. However, band pass filter 144 attenuates the energy in the signal in the range of between 0 and 138 kHz. Note that because band pass filter 144 is used to filter significant energy between 0 and 138 kHz which was not required for band pass filters 122 of FIGS. 4 and 6, a sharper cutoff response is required. Thus, band pass filter 144 needs to be implemented with a higher quality filter than band pass filter 122.

FIG. 10 illustrates in block diagram form a fourth embodiment of an ADSL transmitter 150 for use in communication system 30 of FIG. 3. As before, DSP 11 is similar to the DSPs used in transmitters 100, 130, and 140. However, transmitter 150 includes a modified IFFT 152 connected to output signal 104. Modified IFFT 152 converts the 32 complex ADSL symbols into a corresponding time domain representation provided on an output 153, but a higher data rate of 552 kW/s. In the illustrated embodiment, modified IFFT 152 is implemented as a 64-input IFFT in which the 32 complex inputs corresponding to 0 to 138 kHz are input with zero energy. Note that this modified IFFT may be simplified by not computing those calculations which are known ahead of time to result in zero. DAC 154 has an input connected to output 153, and an output 156. Band pass filter 158 has an input connected to output 156 and an output connected to twisted pair 18 through a transmission line hybrid, not shown in FIG. 10.

FIG. 11 illustrates a graph of the frequency contents of signals conducted in transmitter 150 of FIG. 10. Now considering FIG. 11 in conjunction with FIG. 10, modified IFFT 152 provides output signal 153 without significant energy between 0 and 138 kHz due to the inputting of zero-valued symbols in the range of 0 to 138 kHz. The frequency content between 138 and 276 kHz is representative of the symbols provided on output 104. DAC 154 preserves the frequency content of output 153 on output 156 and as before, if implemented as a sigma delta DAC has a low pass quantization noise shaping filter with a cutoff frequency above 276 kHz. Band pass filter 158 passes frequencies in the range of 138 kHz to 276 kHz and thus, allows a 0 to 80 kHz ISDN signal to be conducted simultaneously on twisted pair 18.

FIG. 12 illustrates, in block diagram form, a first embodiment of an ADSL receiver 200 for use in the ADSL transceiver 40 of ADSL system 30 of FIG. 3. Receiver 200 includes band pass filter 201, Analog-to-digital converter 203, decimator 205, fast Fourier transform 210, and digital signal processor 212. Decimator 205 includes ISDN high pass filter 206 and down sampler 208. Band pass filter 201 has an input connected to twisted pair 18 for receiving an upstream signal, and has an output 202 for providing a band pass filtered signal. Analog-to-digital converter 203 has an input connected to output 202 for receiving the band pass filtered signal, and an output 204. ISDN high pass filter 206 has an input connected to output 204 for receiving the digital signal, and an output 207 for providing a high pass filtered digital signal. Down sampler 208 has an input connected to output 207, and an output 209. Fast Fourier transform 210 has an input connected to output 209, and an output 211. DSP 212 has an input connected to the output 211, and an output for providing digital data labeled "DATA".

In operation, receiver 200 receives the modified upstream ADSL signal and the ISDN signal from twisted pair 18, and provides decoded digital data corresponding to the upstream ADSL signal.

FIG. 13 illustrates a graph of the spectral contents of various signals conducted in receiver 200 of FIG. 12. The graph of FIG. 13 is plotted as power density on the vertical axis versus frequency on the horizontal axis. Each graph is labeled with a reference number corresponding to an input or output of receiver 200 having the same reference number. Also, each graph starts at a base power density labeled "p". The graphs are for illustration purposes only and are not drawn to scale. In FIGS. 13, 15, 17, and 19, the cross-hatched areas on each of the graphs represent ISDN signal as power density versus frequency.

The operation of receiver 200 will be discussed with reference to FIG. 12 and FIG. 13. As discussed above, the ISDN frequencies typically occupy the area from 0 to 80 kHz. Even though most of the frequency content of the ISDN signal is in a frequency band up to 80 kHz, there is residual ISDN energy residing from 80 to about 138 kHz (illustrated in FIG. 13.) The modified ADSL signal received by receiver 200 has a frequency content that occupies the area from 138 kHz to 276 kHz as transmitted by one of the embodiments of transmitters illustrated above. Receiver 200 converts the modified ADSL upstream signal from twisted pair 18 back to a standard compliant ADSL signal. This allows DSP 212 to have no significant changes from DSP 25 of prior art FIG. 2, thus reducing the cost and complexity of implementing receiver 200.

Band pass filter 201 band pass filters the analog signals received from twisted pair 18 to attenuate the ISDN signal and allow the ADSL signal to pass through to analog-to-digital converter 203. Note that in other embodiments, the ISDN signal may be replaced with another signal compliant with another standard, such as the tax tones present in Europe, or POTS in the U.S. Also, note that for purposes of clarity and simplicity, the power density plots, shown in FIGS. 13, 15, 17, and 19 for all of the digital signals, only show frequencies up to one-half of the sampling rate.

Analog-to-digital converter 203 is coupled to output 204 and provides a plurality of digital signals representative of the analog ADSL signal on output 202. In a preferred embodiment, analog-to-digital converter 203 is a conventional sigma-delta converter. ISDN high pass filter 206 and decimator 205 further filters the ISDN signal provided on output 207. The data rate at outputs 204 and 207 are 552 kW/s. Down sampler 208 is a conventional down sampler and is coupled to output 207. Down sampler 208 shifts, or down samples, the ADSL signal back to baseband between about 0 to 138 kHz as illustrated in FIG. 13 at reference number 209. At the same time, down sampler 208 converts the data rate from 552 kW/s to 276 kW/s. Note that in the illustrated embodiment, down sampler 208 down samples by a factor of two. However, in other embodiments, the down sampling may be accomplished using a different factor.

Illustrated in FIG. 13 for output 207 and 209 is the residual power density from the ISDN signal. Any residual power density will be recognized as noise and will cause unwanted interference with the ADSL signal. Therefore, it is important for ISDN high pass filter 206 to remove, or attenuate, most of the ISDN signal. Note that there is additional hardware and/or software, such as equalizers, echo cancellers, etc., placed in the data stream before the FFT (not shown in FIGS. 12, 14, 16, and 18). However, the additional hardware or software are not relevant for purposes of describing the present invention.

FFT 210 receives the signals from down sampler 208 and converts the signals from down sampler 208 at output 209 from the time domain to the frequency domain. DSP 212 receives the frequency domain signals from FFT 210 and further decodes the signals to provide digital output data labeled "OUTPUT DATA" to be used by the communications devices such as video server 58 illustrated in FIG. 3. In addition to allowing the simultaneous operation of an ISDN signal source on twisted pair 18, receiver 200 is able to operate simultaneously with any other signal source which only has a frequency content below 138 kHz.

FIG. 14 illustrates, in block diagram form, receiver 220 in accordance with a second embodiment of the present invention. Receiver 220 includes band pass filter 221, analog-to-digital converter 223, multiplier 225, decimator 227, FFT 232, and DSP 233. Band pass filter 221 has an input coupled to twisted pair 18 and an output labeled 222. Analog-to-digital converter 223 has an input coupled to output 222 and an output labeled 224. Multiplier 225 has a first input coupled to output 224 and a second input for receiving a mixing signal. In a preferred embodiment, the mixing signal is a sine wave having a frequency of 276 kHz. Multiplier 225 has an output labeled 226. Decimator 227 includes low pass filter 228 and down sampler 229. Low pass filter 228 has an input coupled to output 226 and an output labeled 230. Down sampler 229 has an input coupled to output 230 and an output labeled 231. FFT 232 has an input coupled to output 231 and an output. DSP 233 has an input coupled to the output of FFT 232 and an output digital data labeled output data.

FIG. 15 illustrates a graph of the frequency content of various signals conducted in receiver 220. The operation of receiver 220 will be discussed in conjunction with FIGS. 14 and 15. In operation, band pass filter 221 receives ISDN signals and modified upstream ADSL signals from twisted pair 18. Band pass filter 221 attenuates the ISDN signals and passes the ADSL signals as illustrated in FIG. 15 for the graph of output 222. The band pass filtered signals are provided to the analog-to-digital converter 223. Analog-to-digital converter 223 provides a digital representation of the band pass filtered signals to the first input of multiplier 225. Multiplier 225 folds the ADSL signal from the frequency band from 138 kHz to 276 kHz a frequency range from 0 to 138 kHz as illustrated in FIG. 13 for output 226. Simultaneously with the folding of the ADSL signal, the ISDN signal is shifted up in frequency to 138 kHz to 276 kHz. Low pass filter 228 further attenuates the ISDN signal and passes the attenuated ISDN signal and the ADSL signal to down sampler 229, as illustrated in the graph for output 230 in FIG. 15. Down sampler 229 of decimator 227 receives the low pass filtered signal at a data rate of 552 kW/s, and provides a decimated, or down sampled, signal at a rate of 276 kW/s as shown in the graph for output 231. At the same time, the ISDN residual power density is shifted down from the frequency band of 138 kHz to 276 kHz to the frequency band of 0 kHz to 138 kHz. The downshifted residual ISDN signal will be perceived as noise on the ADSL signal as shown in the graph for output 231. Therefore, the total attenuation provided by band pass filter 221 and low pass filter 228 determines the power density of the unwanted residual ISDN signal. The lower the power density of the residual ISDN signal, the better the overall quality of the base band ADSL signal.

FFT 232 performs a time domain to frequency domain conversion on the signals received from output 231, and provides the frequency domain signals to DSP 233. DSP 233 further decodes the ADSL signals and provides digital output data labeled output data to communications devices coupled to communications system 30.

Receiver 220 provides substantially the same output as receiver 200 shown in FIG. 12. However, in receiver 220, a low pass filter and a mixer are used in place of ISDN high pass filter 206. This allows the same result using slightly different hardware and/or software. Note that in a preferred embodiment, a combination of hardware and software is used; however, in other embodiments, the filtering and down sampling may be done in hardware, software, or in a combination thereof.

Figure 16:
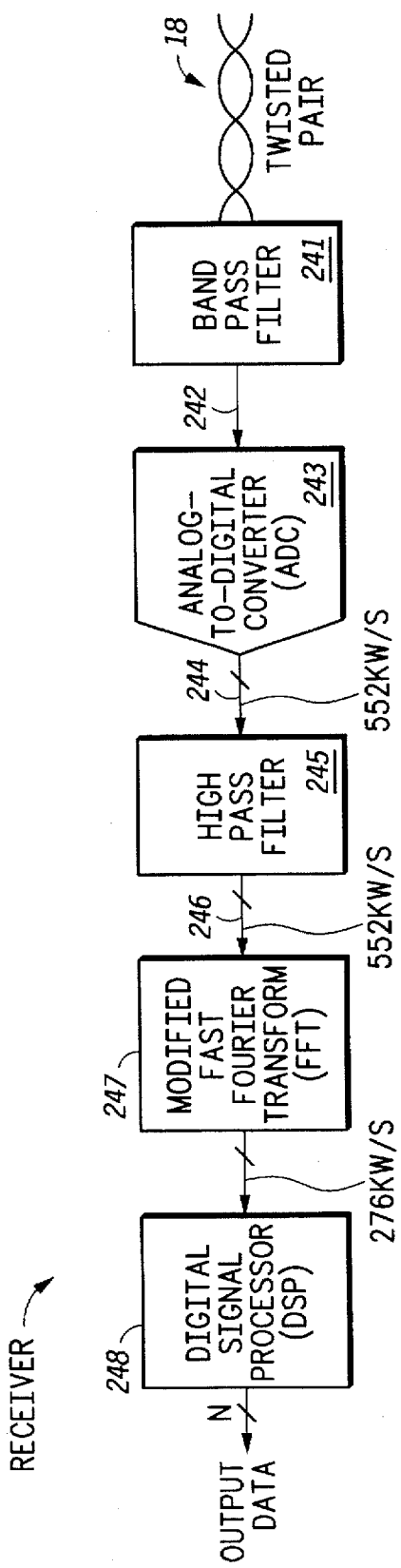
FIG. 16 illustrates, in block diagram form, a third embodiment of an ADSL receiver for use in the system of FIG. 3.

FIG. 16 illustrates, in block diagram form, receiver 240 in accordance with a third embodiment of the present invention for use in the system of FIG. 3. Receiver 240 includes band pass filter 241, analog-to-digital converter 243, high pass filter 245, modified FFT 247, and DSP 248. Band pass filter 241 has an input coupled to twisted pair 18 for simultaneously receiving the ISDN signal and the modified upstream ADSL signal. Band pass filter 241 also has an output labeled 242. Analog-to-digital converter 243 has an input coupled to output 242 and a plurality of outputs labeled 244 for providing a digital signal representative of the signal at output 242. High pass filter 245 has an input coupled to output 244 and an output labeled 246. Modified FFT 247 has an input coupled to the output of high pass filter 245 and an output. DSP 248 has an input coupled to the output of the modified FFT 247 and an output labeled output data.

Figure 17:
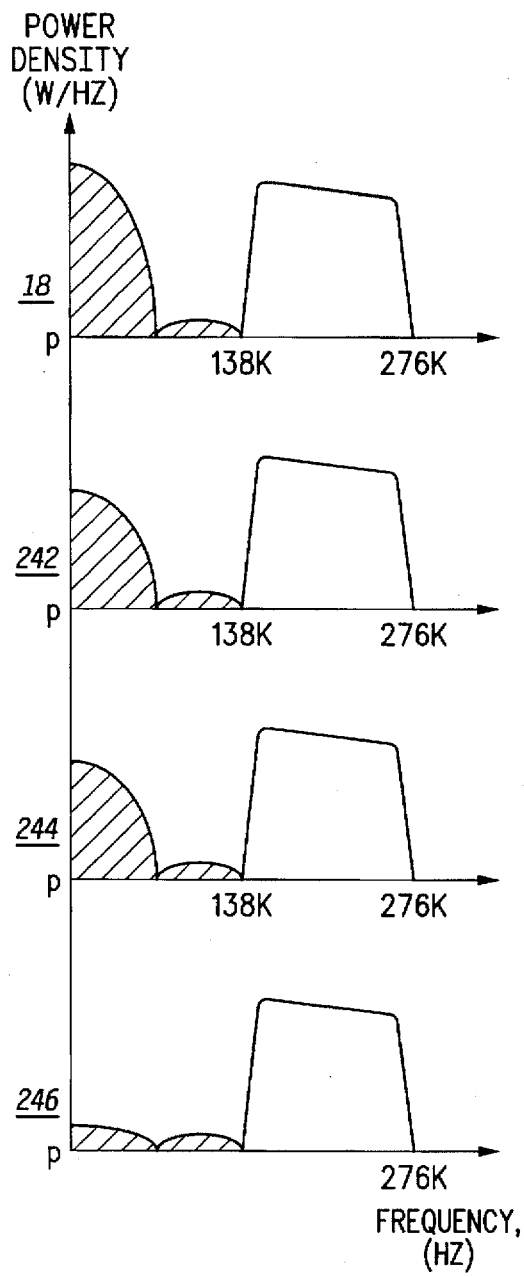
FIG. 17 illustrates a graph of the spectral contents of signals conducted in the receiver of FIG. 16.

FIG. 17 illustrates a graph of the frequency content of various signals conducted in receiver 240. The operation of receiver 240 will be discussed with reference to both of FIGS. 16 and 17. In operation, band pass filter 241 band pass filters, or attenuates, the ISDN signal received from twisted pair 18, and passes the upstream ADSL signal having a frequency content of between 138 kHz and 276 kHz. The band pass filtered signals are provided to output 242 as illustrated in FIG. 17. Output 244 includes the digital representation of the ADSL signal and provides it to high pass filter 245 at a data rate of 552 kW/s. High pass filter 245 further attenuates the ISDN signals and passes the ADSL signals at the same data rate of 552 kW/s.

Modified FFT 247 functions to convert signals on output 246 from the time domain to the frequency domain. The modified FFT 247 shown in FIG. 16 is modified from FFT 210, FFT 257, and FFT 232, in that modified FFT 247 receives data at twice the 276 kW/s rate, or 552 kW/s. Modified FFT 247 only outputs at a data rate of 276 kW/s. This is accomplished by "pruning" the outputs of FFT 247. In effect, modified FFT 247 is essentially a 552 kW/s output FFT that is optimized to have only a 276 kW/s output data rate. Those outputs are also reordered so that the output from FFT 247 matches the output from FFTs 210, 232, and 257. Note that receiver 240 in FIG. 16 does a reordering and pruning using modified FFT 247. The reordering is illustrated in FIG. 15 by reversing the slope of the top portion of the ADSL signal. Note that in other embodiments, the reordering may be accomplished in a DSP instead of the FFT. The signals outputted from modified FFT 247 are provided to DSP 248. DSP 248 further decodes the upstream ADSL signal to provide digital output data signals labeled OUTPUT DATA. Unlike the embodiments shown in FIG. 12 and FIG. 14, receiver 240 provides the down sampling function in the modified FFT block, rather than using separate decimators with down samplers. As described above, the residual ISDN signal will appear as noise on the ADSL signal after the output of the modified FFT 247 (not shown in FIG. 17).

Figure 18:
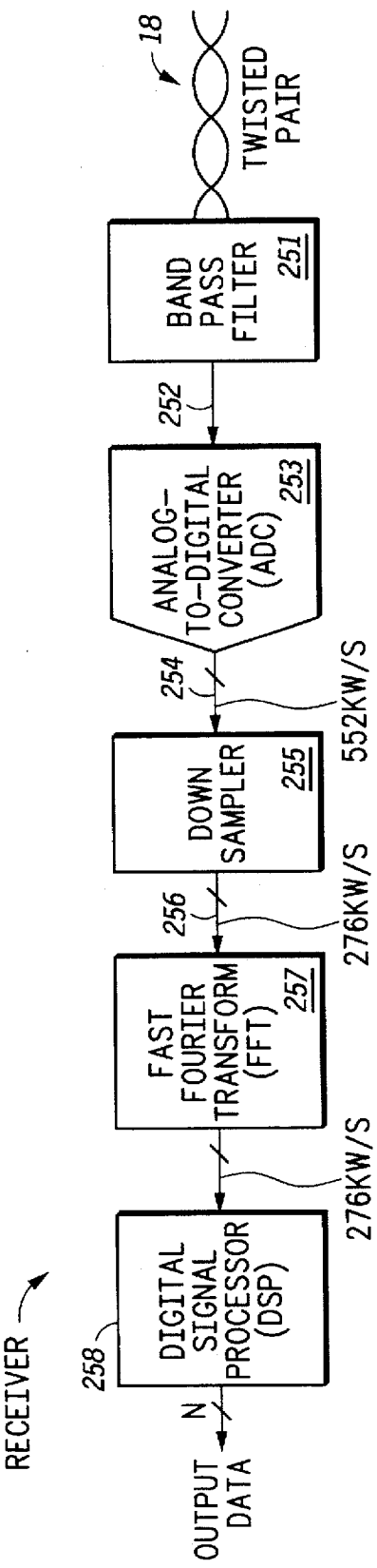
FIG. 18 illustrates, in block diagram form, a fourth embodiment of an ADSL receiver for use in the system of FIG. 3.

FIG. 18 illustrates, in block diagram form, receiver 250 in accordance with a fourth embodiment of the present invention for use in the system of FIG. 3.

Receiver 250 includes band pass filter 251, analog-to-digital converter 253, down sampler 255, FFT 257, and DSP 258. Band pass filter 251 has an input coupled to twisted pair 18 and an output labeled 252. Analog-to-digital converter 253 has an input coupled to output 252 and a plurality of outputs 254 for providing a digital representation of the ADSL signal from twisted pair 18. Down sampler 255 has input coupled to output 254, and an output 256. FFT 257 has an input coupled to output 256 and an output. DSP 258 has an input coupled to the output of FFT 257, and an output for providing a digital output data labeled "OUTPUT DATA".

Figure 19:
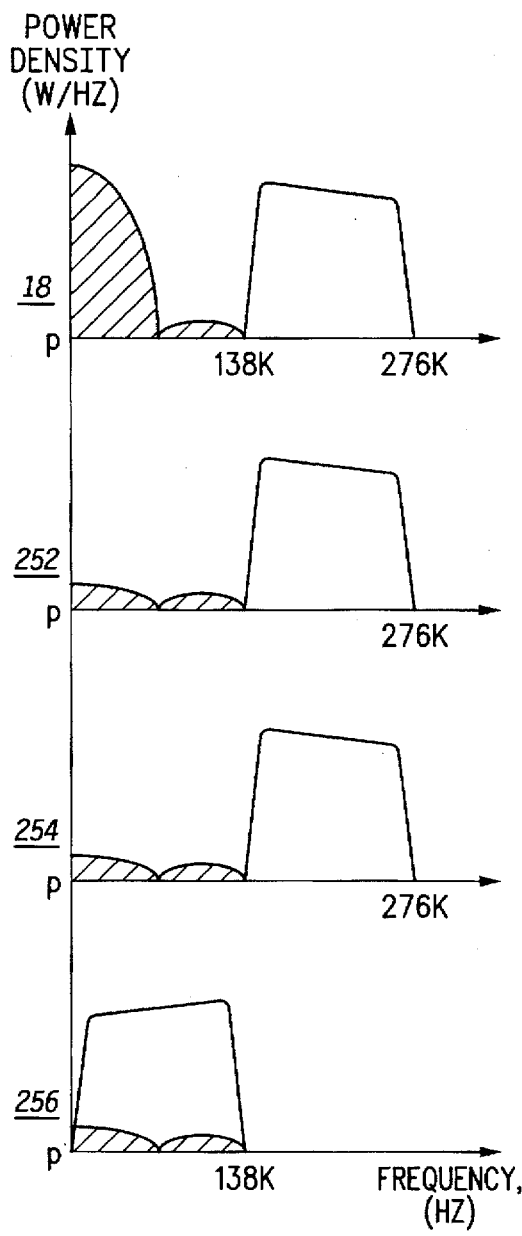
FIG. 19 illustrates a graph of the spectral contents of signals conducted in the receiver of FIG. 18.

FIG. 19 illustrates a graph of the frequency contents of various signals conducted in receiver 250 of FIG. 18. In operation, band pass filter 251 receives both ISDN signals and the modified upstream ADSL signals from twisted pair 18 and band pass filters, or attenuates, the ISDN signals, while passing the ADSL signals to output 252. Analog-to-digital converter 253 receives the band pass filtered signals and provides digital signals to down sampler 255. The data rate of analog-to-digital converter 253 above the highest frequency of the upstream ADSL signal. Output 252 is illustrated in FIG. 19 having reference number 252. Output 254 from analog-to-digital converter is illustrated in FIG. 19 and has a sampling rate of 552 kW/s to the input of down sampler 255. Down sampler 255 provides decimated, or down sampled ADSL signals to output 256 that are shifted from 138 kHz to 276 kHz to a frequency band from 0 to 138 kHz. As discussed above, the attenuated, or residual ISDN signals appear as noise. Down sampler 255 converts the data rate of the signal at output 254 from 552 kW/s to a data rate of 276 kW/s, and provides the down sampled signal at output 256.

FFT 257 is essentially the same as FFT 210 and FFT 232. FFT 257 provides signals at a data rate of 276 kW/s. DSP 258 further decodes the output of FFT 257 and provides digital output data representative of the modified upstream ADSL signal.

In contrast to the receivers illustrated above in FIG. 12, FIG. 14, and FIG. 16, which include filters in both the digital domain as well as the analog domain, band pass filter 251 must perform all of the filtering of the ISDN signals in receiver 250 in the analog domain. Performing all of the filtering and attenuation in the analog domain has a disadvantage of being more expensive than the embodiments illustrated above. However, band pass filter 251, by attenuating and band pass filtering the ISDN signal in the analog domain, eliminates the need for digital filtering, allowing a less expensive digital processor since fewer operations are required for processing the digital signal.

While the invention has been described in the context of a preferred embodiment, it will be apparent to those skilled in the art that the present invention may be modified in numerous ways and may assume many embodiments other than that specifically set out and described above. Note that while the interpolator illustrated in the various transmitter embodiments interpolated its input signal by a factor of two, which is easily accomplished in digital logic circuitry, another interpolation factor may be used as well. Also a communication system according to the present invention may also be used with another, non-ISDN signal source such as European tax tones, POTS transceivers, or any other source of low frequency signal energy. Accordingly, it is intended by the appended claims to cover all modifications of the invention which fall within the true spirit and scope of the invention.

What is claimed is:

1. An ADSL receiver, comprising:
   a band pass filter having an input for receiving an analog ADSL signal, and output;
   an analog-to-digital converter having an input coupled to the output of the band pass filter, and an output for providing a digital signal representative of the analog ADSL signal;

an ISDN filter having an input coupled to the output of the analog-to-digital converter, and an output; and a down sampler having an input coupled to the output of the ISDN filter, and an output coupled to the time-to-frequency converter;

a time-to-frequency converter having an input coupled to the output of the down sampler, and an output; and a digital signal processor having an input coupled to the output of the time-to-frequency converter, and an output for providing decoded digital data.

2. The ADSL receiver of claim 1, wherein the time-to-frequency converter is further characterized as being implemented with a Fast Fourier Transform.

3. The ADSL receiver of claim 1, wherein the ISDN filter removes signal frequencies below about 138 kHz.

4. The ADSL receiver of claim 3, wherein the down sampler is a decimator.

5. The ADSL receiver of claim 4, wherein the decimator decimates by a factor of two.

6. The ADSL receiver of claim 1, wherein the ISDN filter is further characterized as being an ISDN high pass filter.

7. The ADSL receiver of claim 1, wherein the band pass filter substantially removes signal frequencies outside of a band from about 138 kHz to 276 KHz.

8. The ADSL receiver of claim 1, wherein the analog-to-digital converter is a sigma-delta converter.

9. The ADSL receiver of claim 1, wherein the analog-to-digital converter produces a word rate of about 552 kilo words per second.

10. An ADSL receiver, comprising:

a band pass filter having an input for receiving an analog ADSL signal, and output;

an analog-to-digital converter having an input coupled to the output of the band pass filter, and an output for providing a digital signal representative of the analog ADSL signal;

a multiplier having a first input coupled to the output of the analog-to-digital converter, a second input for receiving a mixing signal, and an output for providing a frequency folded signal;

a decimator having an input coupled to the output of the analog-to-digital converter for receiving the frequency folded signal, and an output for providing a decimated signal;

a time-to-frequency converter having an input coupled to the output of the decimator for receiving the decimated signal, and an output for providing a frequency domain signal; and a digital signal processor having an input coupled to the output of the time-to-frequency converter for receiving the frequency domain signal, and an output for providing decoded digital data.

11. The ADSL receiver of claim 10, wherein the decimator comprises:

a low pass filter having an input coupled to the output of the multiplier, and an output; and a down sampler having an input coupled to the output of the low pass filter, and an output coupled to the time-to-frequency converter.

12. The ADSL receiver of claim 10, wherein the analog-to-digital converter provides the digital signal at a word rate of about 552 kilo words per second, the mixing signal is a sine wave having a frequency of about 276 kilo hertz and the sine wave is sampled at about 552 kilo samples per second.

13. A central office terminal for connection to a telephone line, comprising:

a first terminal coupled to an asymmetric digital subscriber line (ADSL) signal source having a first frequency content;

a second terminal coupled to a second signal source having a second frequency content, wherein the frequencies of the first and second frequency contents do not overlap; and a receiver circuit coupled to said first terminal, wherein the receiver circuit receives the first and second frequency contents, substantially removes the second frequency content, and decodes the first frequency content to provide decoded digital data;

wherein said ADSL signal source and said second signal source may simultaneously utilize the telephone line.

14. The central office terminal of claim 13, wherein the receiver circuit comprises:

a band pass filter having an input for receiving an ADSL signal from the ADSL signal source, and output;

an analog-to-digital converter having an input coupled to the output of the band pass filter, and an output for providing digital data representative of the ADSL signal;

a decimator having an input coupled to the output of the analog-to-digital converter, and an output;

a time-to-frequency converter having an input coupled to the output of the decimator, and an output; and a digital signal processor having an input coupled to the output of the time-to-frequency converter, and an output for providing the decoded digital data.

15. The central office terminal of claim 13, wherein the receiver circuit comprises:

a band pass filter having an input for receiving the ADSL signal, and an output;

an analog-to-digital converter having an input coupled to the output of the band pass filter, and an output for providing digital data representative of the ADSL signal;

a multiplier having a first input coupled to the output of the analog-to-digital converter, a second input for receiving a mixing signal, and an output for providing a frequency folded signal;

a decimator having an input coupled to the output of the analog-to-digital converter for receiving the frequency folded signal, and an output for providing a decimated signal;

a time-to-frequency converter having an input coupled to the output of the decimator for receiving the decimated signal, and an output for providing a frequency domain signal; and digital signal processor having an input coupled to the output of the time-to-frequency converter for receiving the frequency domain signal, and an output for providing the decoded digital data.

16. The central office terminal of claim 13, wherein the receiver circuit comprises:

a band pass filter having an input for receiving an ADSL signal, and output;

an analog-to-digital converter having an input coupled to the output of the band pass filter, and an output for providing a digital ADSL signal;

a high pass filter having an input coupled to the output of the analog-to-digital converter, and an output for providing a filtered digital ADSL signal;

a time-to-frequency converter having an input coupled to the output of the high pass filter for receiving the filtered digital ADSL signal at the first frequency content at a first data rate, shifting the first frequency content to a third frequency content and down sampling the filtered digital ADSL signal to a second data rate, wherein the second data rate is slower than the first data rate, the time-to-frequency converter having an output for providing a frequency domain signal representative of the first frequency content at the second data rate; and a digital signal processor having an input coupled to the output of the time-to-frequency converter for receiving the first frequency content, and an output for providing decoded digital data.

17. The central office terminal of claim 13, wherein the receiver circuit comprises:

a band pass filter having an input for receiving the ADSL signal, and output;

an analog-to-digital converter having an input coupled to the output of the band pass filter, and an output for providing digital data representative of the ADSL signal, wherein the analog-to-digital converter samples above the highest frequency of the ADSL signal;

a decimator having an input coupled to the output of the analog-to-digital converter for receiving the frequency shifted signal, and an output for providing a decimated signal;

a time-to-frequency converter having an input coupled to the output of the high pass filter, and an output for providing a frequency domain signal; and a digital signal processor having an input coupled to the output of the time-to-frequency converter, and an output for providing decoded digital data.

18. A method for decoding an analog ADSL signal, comprising the steps of:

band pass filtering the analog ADSL signal to provide a filtered analog ADSL signal;

converting the filtered analog ADSL signal to a digital data signal representative of the analog ADSL signal;

filtering the digital data signal using an ISDN high pass filter to produce a filtered digital data signal;

down sampling the filtered digital data signal to produce a down sampled digital data signal;

converting the down sampled digital data signal to a frequency domain digital data signal; and decoding the frequency domain digital data signal to provide decoded digital data.

19. A method for decoding an analog ADSL signal, comprising the steps of:

band pass filtering the analog ADSL signal;

converting the analog ADSL signal to a digital ADSL signal;

mixing the digital ADSL signal with a mixing signal to produce a frequency folded digital ADSL signal;

decimating the frequency folded digital ADSL signal to produce a decimated frequency folded digital ADSL signal;

converting the decimated frequency folded digital ADSL signal to a frequency domain decimated frequency folded digital ADSL signal; and decoding the frequency domain decimated frequency folded digital ADSL signal to produce a decoded digital data.

* * * * *